US010770857B2

(12) United States Patent
Kobayashi et al.

(10) Patent No.: US 10,770,857 B2
(45) Date of Patent: Sep. 8, 2020

(54) ELECTRONIC EQUIPMENT ASSEMBLY METHOD

(71) Applicant: Panasonic Intellectual Property Management Co., Ltd., Osaka (JP)

(72) Inventors: Ikuo Kobayashi, Osaka (JP); Takao Ojima, Kyoto (JP); Minoru Yamamoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 15/823,651

(22) Filed: Nov. 28, 2017

(65) Prior Publication Data

US 2018/0183200 A1   Jun. 28, 2018

(30) Foreign Application Priority Data

Dec. 28, 2016  (JP) .................................. 2016-254951
Dec. 28, 2016  (JP) .................................. 2016-254955

(51) Int. Cl.
*H01R 43/20*    (2006.01)
*H01R 43/26*    (2006.01)
(Continued)

(52) U.S. Cl.
CPC .......... *H01R 43/205* (2013.01); *B25J 9/1682* (2013.01); *B25J 9/1687* (2013.01);
(Continued)

(58) Field of Classification Search
CPC ......... B25J 3/00; B25J 3/04; B25J 9/04; B25J 11/00; B25J 11/005; B25J 15/04; B25J 17/02; B25J 18/00; B25J 18/04; B25J 9/1682; B25J 9/1687; B25J 15/0004; B25J 15/0033; B25J 15/0616; B25J 19/023; H02G 11/00; H01R 12/00; H01R 12/57; H01R 13/629; H01R 43/205; H01R 43/26

See application file for complete search history.

(56) References Cited

U.S. PATENT DOCUMENTS 4,518,298  A  *  5/1985  Yasukawa ................ B25J 9/044
                                                        414/4
5,000,653  A  *  3/1991  Gosdowski ............. B25J 9/042
                                                        414/744.5
(Continued)

FOREIGN PATENT DOCUMENTS

EP    2 551 068 A1  *  1/2013
JP    60-180795 A   *  9/1985
(Continued)

*Primary Examiner* — Carl J Arbes
(74) *Attorney, Agent, or Firm* — Pearne & Gordon LLP

(57) ABSTRACT

An electronic equipment assembly apparatus includes a cable holding tool, a work stage, and a robot unit. The cable holding tool holds the cable. The work stage holds the electronic equipment. The robot unit relatively moves the cable holding tool with respect to the electronic equipment held by the work stage. The cable holding tool includes a contactor and a width direction regulator. The contactor holds the cable by vacuum-sucking. The width direction regulator regulates a position in a width direction of the cable which comes into contact with the contactor.

6 Claims, 15 Drawing Sheets

(51) Int. Cl.
  *H01R 13/629* (2006.01)
  *B25J 9/16* (2006.01)
  *H01R 12/57* (2011.01)
  *H01R 12/00* (2006.01)
  *B25J 15/00* (2006.01)
  *B25J 15/06* (2006.01)
  *B25J 19/02* (2006.01)

(52) U.S. Cl.
  CPC ....... *B25J 15/0004* (2013.01); *B25J 15/0033* (2013.01); *B25J 15/0616* (2013.01); *B25J 19/023* (2013.01); *H01R 12/00* (2013.01); *H01R 12/57* (2013.01); *H01R 13/629* (2013.01); *H01R 43/26* (2013.01)

(56) References Cited

U.S. PATENT DOCUMENTS

| | | | | |
|---|---|---|---|---|
| 5,205,701 | A * | 4/1993 | Kigami | B25J 9/0009 285/305 |
| 6,288,512 | B1 * | 9/2001 | Berninger | B25J 19/0025 191/12 R |
| 7,422,412 | B2 * | 9/2008 | Akaha | B25J 9/042 414/744.5 |
| 8,668,428 | B2 * | 3/2014 | Hino | B25J 9/042 414/744.5 |
| 9,289,898 | B2 * | 3/2016 | Ono | B25J 9/042 |
| 2004/0266276 | A1 | 12/2004 | Hariki et al. | |
| 2010/0256818 | A1 | 10/2010 | Aoba et al. | |

FOREIGN PATENT DOCUMENTS

| | | | |
|---|---|---|---|
| JP | H06-111907 | A | 4/1994 |
| JP | 2002-213934 | A | 7/2002 |
| JP | 2004-274613 | A | 9/2004 |
| JP | 2005-011580 | A | 1/2005 |
| JP | 2009-107043 | A | 5/2009 |
| JP | 2012-101356 | * | 5/2012 |
| JP | 2013-089786 | A | 5/2013 |
| JP | 2015-030086 | A | 2/2015 |
| JP | 2016-209967 | A | 12/2016 |

* cited by examiner (a)

(b)

(a)

(b)

(a)

(b)

(c)

(a)

(b)

(a)

(b)

ELECTRONIC EQUIPMENT ASSEMBLY METHOD

BACKGROUND

1. Technical Field

The present disclosure relates to an electronic equipment assembly apparatus which performs assembly work for installing an installed portion of a cable onto a connector, and an electronic equipment assembly method.

2. Description of the Related Art

In electronic equipment, such as a portable terminal, a flexible cable (hereinafter, simply referred to as "cable"), such as a flexible printed circuits (FPC), which connects functional modules, such as a display device or a circuit board which configures the equipment to each other, is frequently used. In addition, in an assembly process of assembling the electronic equipment, connection work for installing an installed portion of a cable onto a connector of a connection target is performed. The connection work is performed by manual work before, but it is difficult to improve work efficiency since the connection work, which regards the cable as a target, is complicated work accompanied by fine positioning, and automation of the type of work is suggested (for example, Japanese Patent Unexamined Publication No. 2005-11580 (PTL 1)).

In the technology of the related art illustrated in PTL 1, the work for connecting a connector provided in a cable with a connector to a counterpart connector provided in a member, such as a board, is performed by two robots, such as a first robot and a second robot. In other words, in a state where the cable with a connector is interposed and fixed by the first robot, the position and the posture are acquired by imaging the connector using a first camera provided in the second robot. Next, based on the acquired position detection result, after gripping the connector by the second robot, data about the position and the posture is obtained by imaging the connector and a counterpart connector by the second camera provided in the first robot, and while performing the position correction based on the data, the connector is connected to the counterpart connector.

SUMMARY

An electronic equipment assembly apparatus of the disclosure installs an installed portion of a belt-shape cable onto a connector of electronic equipment.

The electronic equipment assembly apparatus includes a cable holding tool, a work stage, and a robot unit.

The cable holding tool holds the cable.

The work stage holds the electronic equipment.

The robot unit relatively moves the cable holding tool with respect to the electronic equipment held by the work stage.

The cable holding tool includes a contactor and a width direction regulator.

The contactor holds the cable by vacuum-sucking.

The width direction regulator regulates a position in a width direction of the cable which comes into contact with the contactor.

An electronic equipment assembly method of the disclosure is a method for installing a second end portion of a belt-shape cable onto a connector of electronic equipment in a state where a first end portion of the belt-shape cable including the first end portion and the second end portion is connected to an electronic circuit.

The electronic equipment assembly method includes: holding an intermediate part of the cable by a cable holding tool; allowing the cable holding tool to be close to the second end portion by relatively sliding the cable holding tool with respect to the cable while holding the cable by the cable holding tool; and installing the second end portion onto the connector by relatively moving the cable holding tool with respect to the connector.

DETAILED DESCRIPTION

Figure 1:
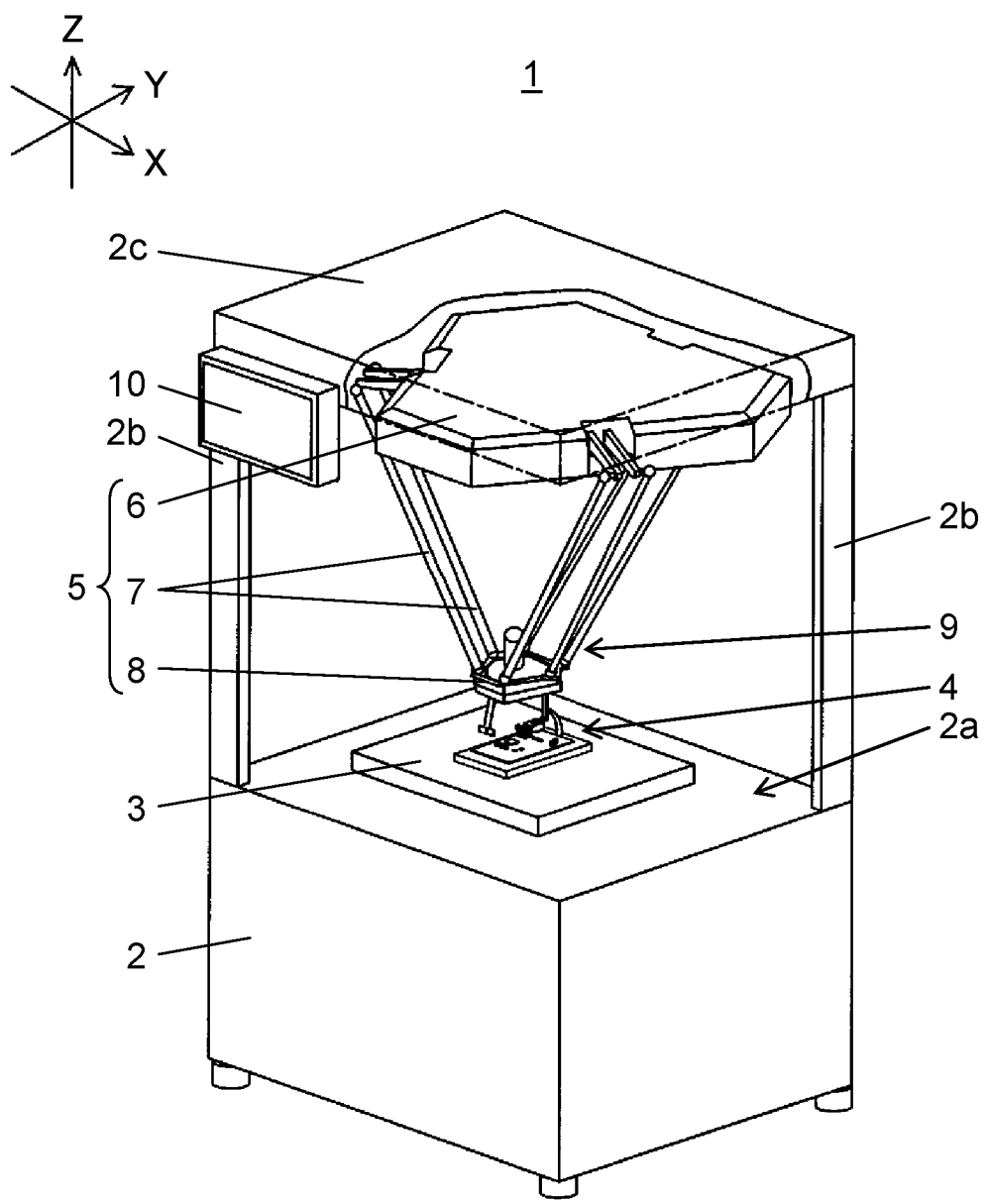
FIG. 1 is a perspective view of an electronic equipment assembly apparatus of an exemplary embodiment.

The size or the thickness of a connector or a cable which is used on the inside of electronic equipment decreases in accordance with a decrease in size of the electronic equipment. According to an example of PTL 1, the structure has been changed to a structure in which connector 3 of cable 1 is disused, and a final end of the cable is directly inserted into counterpart connector 6 and is connected to counterpart connector 6. In a case of handling cable with a connector 1 of the related art by using a robot, there is a case where it is relatively easy to perform the handling since it is possible to grip connector 3 having the size and rigidity that make it possible to grip connector 3 by using a robot hand. However, the final end of the cable of which connector 3 is removed is thin and is likely to be bent, and it is extremely difficult to grip the cable by using second robot 20 as described in PTL 1. Therefore, work for installing the cable onto the connector exclusively depends on manual work.

Next, the present exemplary embodiment will be described with reference to the drawings. First, with reference to FIG. 1, an overall configuration of electronic equipment assembly apparatus 1 will be described. Electronic equipment assembly apparatus 1 connects functional modules to each other by a belt-shape cable, such as a flexible printed board, regarding electronic equipment 4 (refer to FIGS. 3 and 4), such as a portable terminal, as a work target. The belt-shape cable includes one end portion (first end portion) and the other end portion (second end portion). One end portion of the cable is connected to an electronic circuit in advance. Electronic equipment assembly apparatus 1 has a function of automatically installing an installed portion formed in the other end portion of the cable onto the connector of the circuit board.

In FIG. 1, work stage 3 is provided on upper surface 2a of base 2, and work stage 3 positions and holds electronic equipment 4 which is the work target. Here, with reference to FIGS. 3 and 4, electronic equipment 4 which is the work target will be described. In addition, FIG. 3 illustrates a state before the cable is installed onto the connector, and FIG. 4 illustrates a state where the cable is installed onto the connector.

Figure 3:
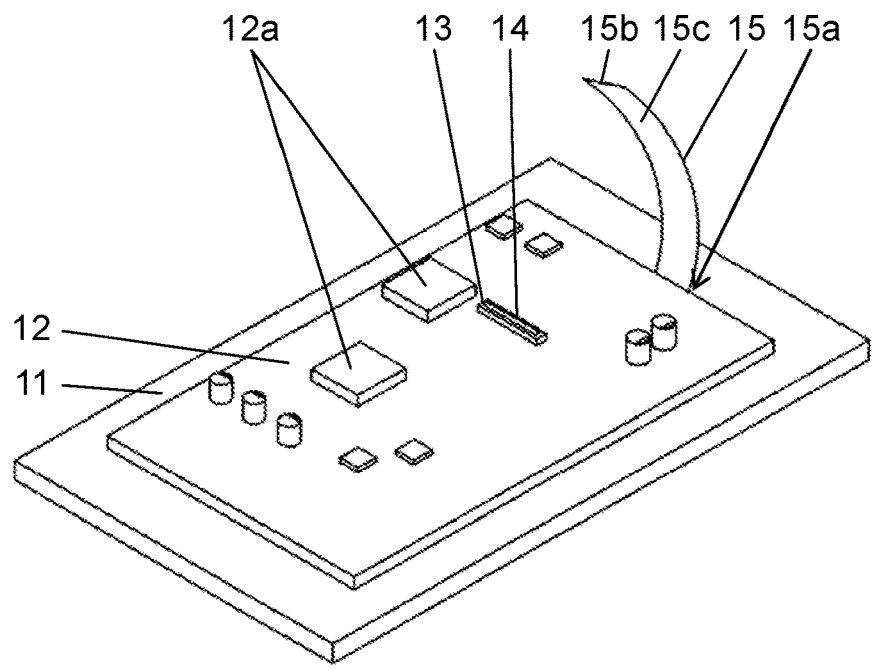
FIG. 3 is a perspective view of electronic equipment (before installing a cable) which is a work target of the electronic equipment assembly apparatus of the exemplary embodiment.
Figure 4:
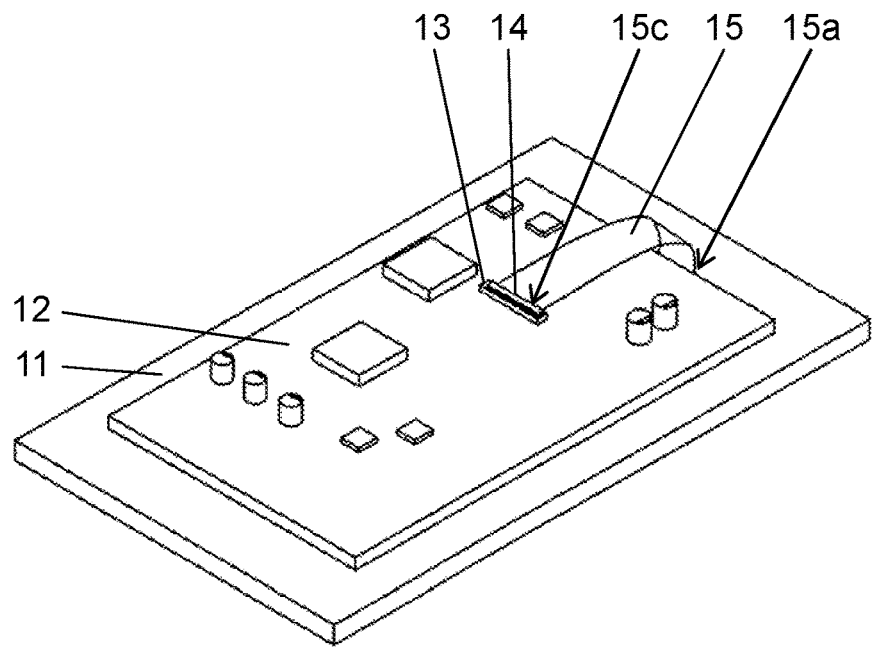
FIG. 4 is a perspective view of the electronic equipment (before installing the cable) which is the work target of the electronic equipment assembly apparatus of the exemplary embodiment.

In FIG. 3, electronic equipment 4 is in-vehicle electronic equipment provided with a display device. Circuit board 12 which is a main body of electronic equipment 4 is conveyed into work stage 3 in a state of being held by board carrier 11 for handling. Circuit board 12 has a rectangular shape, and a plurality of electronic components 12a are mounted on the upper surface of circuit board 12. On one side of circuit board 12, belt-shape cable 15 is installed. Specifically, one end portion 15a of cable 15 is connected to the electronic circuit (not illustrated) provided on circuit board 12. The other end portion 15b of cable 15 is a free end having an upward posture.

On a mounting surface of circuit board 12, connector 13 is provided. On connector 13, installed portion 15c (refer to FIG. 12) formed in the other end portion 15b on a side opposite to one end portion 15a of cable 15 is installed. In connector 13, a terminal row for connection is formed on terminal surface 13b (refer to FIG. 11) of a bottom surface of installer 13a on which installed portion 15c is installed, and in a state where installed portion 15c is inserted into and installed onto connector 13, wiring pattern 15d (refer to FIG. 12) formed in installed portion 15c comes into contact with the terminal rows.

Connector 13 is provided with swing portion 14 (refer to FIG. 11) that configures a lock mechanism for preventing installed installed portion 15c from falling out. Swing portion 14 is provided to oscillate and to be freely open and closed with respect to connector 13, and in a state where electronic equipment 4 is conveyed into work stage 3 before installing installed portion 15c onto connector 13, and as illustrated in FIG. 3, swing portion 14 is in a state of being pushed down and a lock thereof is enabled.

Figure 10:
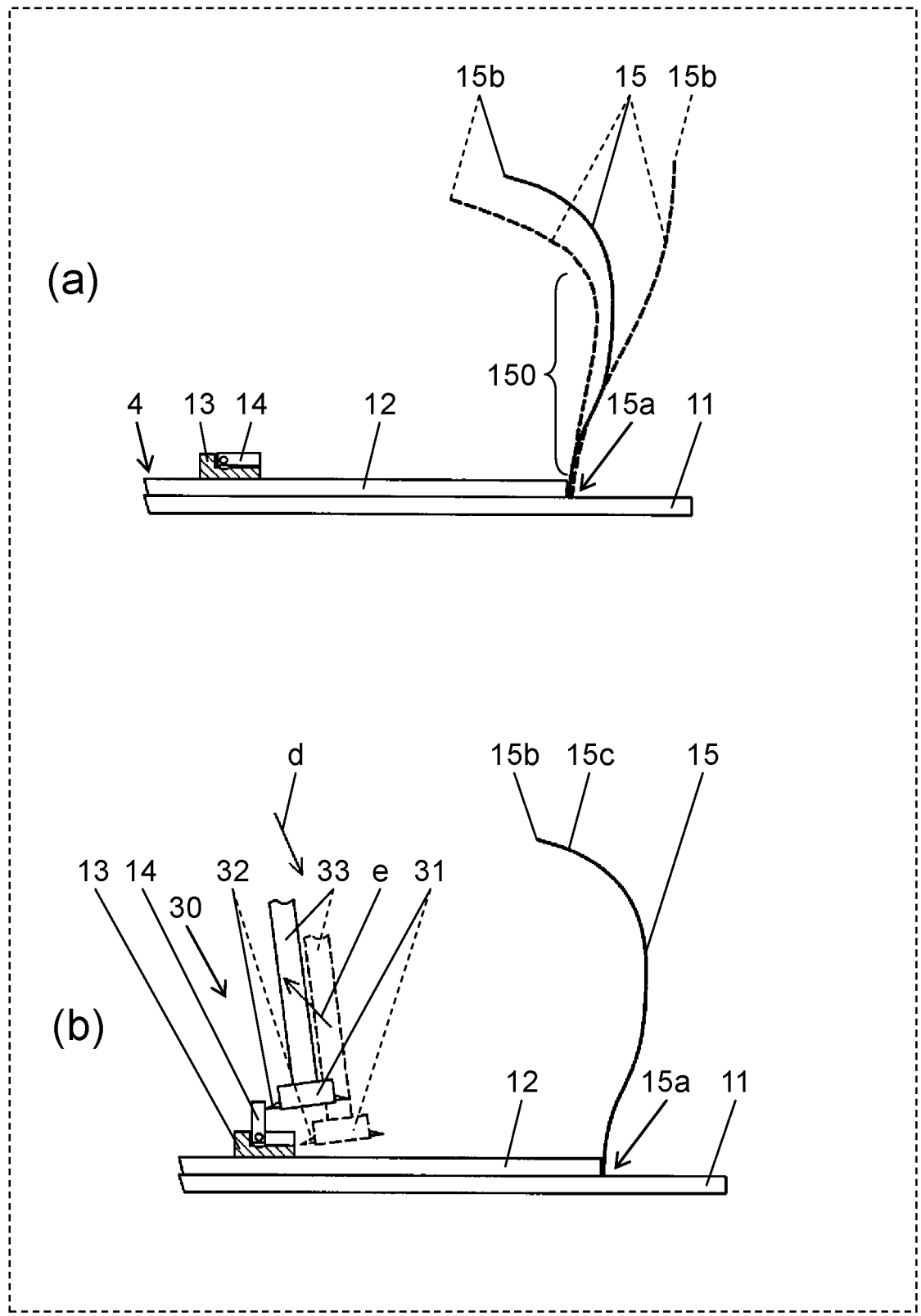
FIG. 10 is an operation explanation view illustrating an electronic equipment assembly method of the exemplary embodiment.
Figure 11:
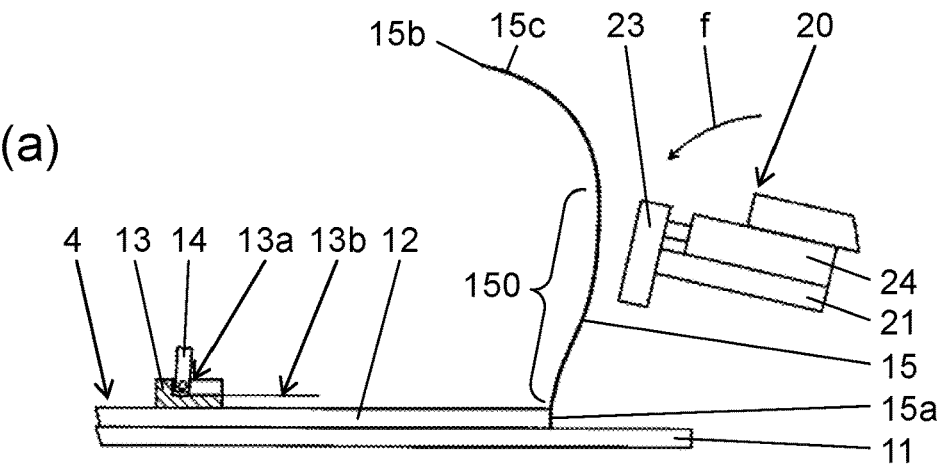
FIG. 11 is an operation description view illustrating the electronic equipment assembly method of the exemplary embodiment.
Figure 11:
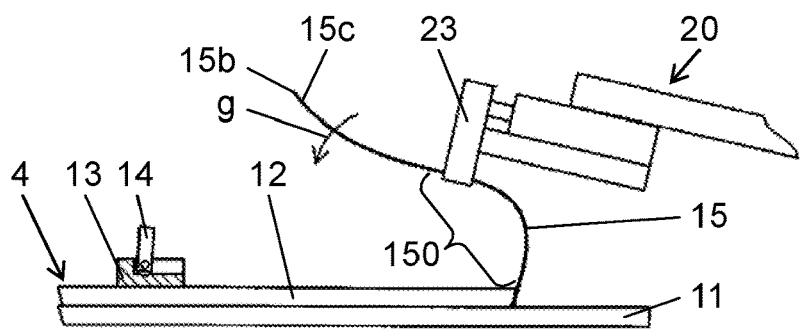
Figure 11:
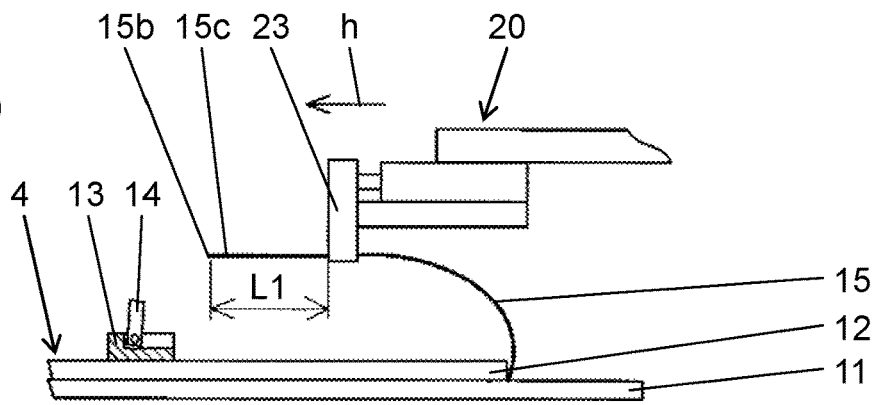
Figure 13:
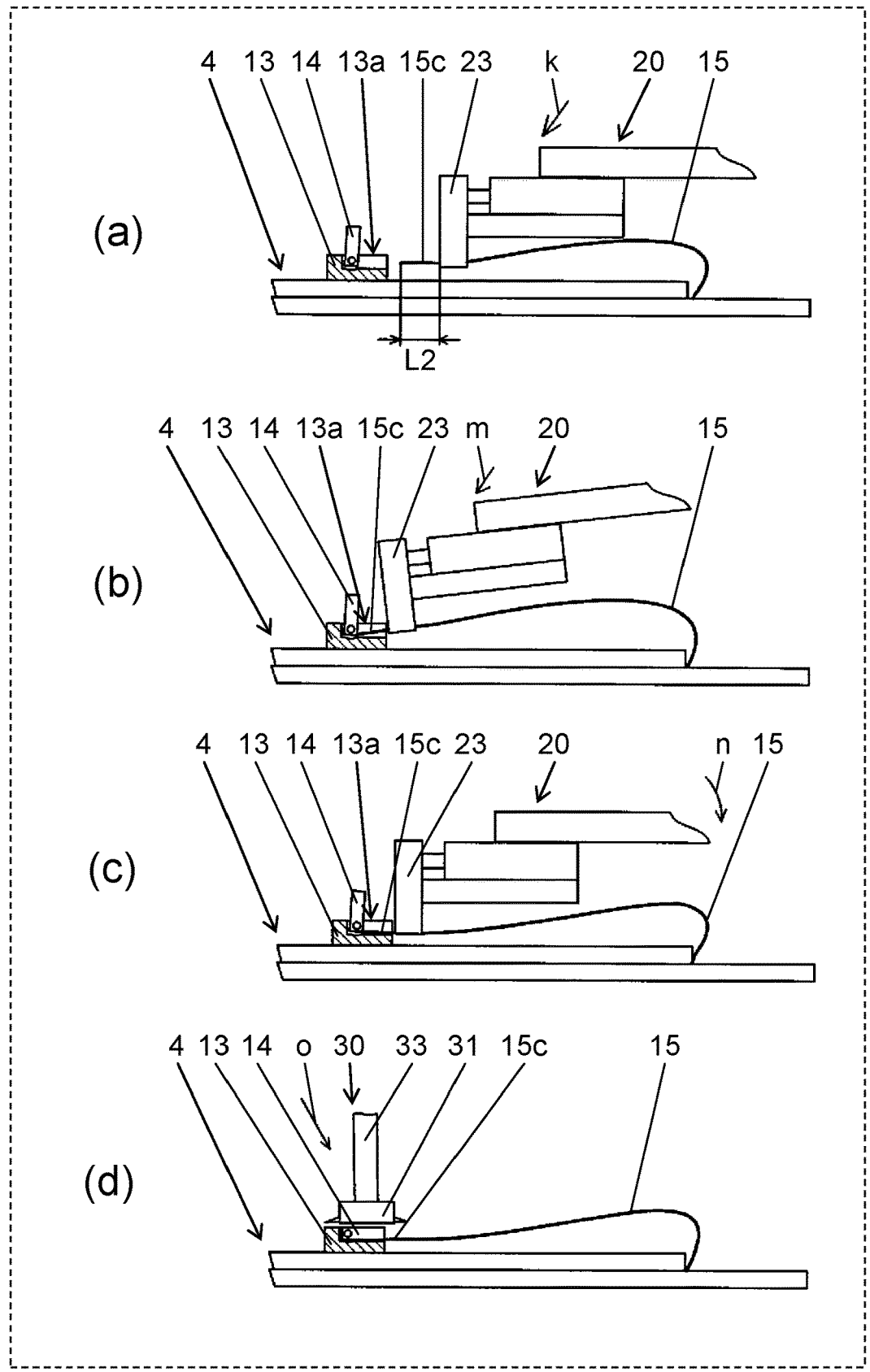
FIG. 13 is an operation description view illustrating the electronic equipment assembly method of the exemplary embodiment.

When installing installed portion 15c onto connector 13, connector installation work is performed in a state where swing portion 14 is allowed to stand and the lock is released (refer to FIGS. 10, 11, and 13). In addition, as illustrated in FIG. 4, after installing installed portion 15c onto connector 13, the lock is enabled again. In other words, swing portion 14 is in a state of being pushed down and closed, installed portion 15c is prevented from being pushed in and falling out by swing portion 14.

In FIG. 1, a raising and lowering operation and a rotation operation are possible with respect to work stage 3. In the installation work of cable 15 which regards electronic equipment 4 as a work target, by raising and lowering work stage 3, electronic equipment 4 is disposed at a predetermined work height. In addition, by rotating work stage 3, a side on which cable 15 which is the work target is provided in electronic equipment 4 is positioned to a predetermined working position by robot unit 5 which will be described hereinafter.

Corner post 2b stands in a corner portion of upper surface 2a of base 2, and horizontal frame 2c is built in the upper end portion of corner post 2b. On a side surface of frame 2c, operation panel 10 provided with a touch panel is disposed. An instruction input for instructing an operation in which robot unit 5 is regarded as a target is executed by a touch operation input via operation panel 10. Operation panel 10 has a display function, and notification in a case where abnormality or a defect is generated in a cable installing operation performed by electronic equipment assembly apparatus 1 is displayed on operation panel 10. In addition, regarding a coordinate system of electronic equipment assembly apparatus 1, a direction which is horizontal from side to side when viewed from a front surface of electronic equipment assembly apparatus is an X axis, an axis orthogonal to the X axis in a forward-and-rearward direction is a Y axis, and an axis perpendicular to the X axis and the Y axis in an upward-and-downward direction is a Z axis.

On a lower surface of frame 2c, fixing base 6 in which a driving mechanism of robot unit 5 which will be described hereinafter is embedded is installed. Six servo driving mechanisms which are separately operated are embedded in fixing base 6, and each of the servo driving mechanisms separately drives six link members 7 which extend downward from fixing base 6. A lower end portion of link member 7 is bonded to base 8. In the above-described configuration, fixing base 6, link member 7, and base 8 configure robot unit 5.

Figure 2:
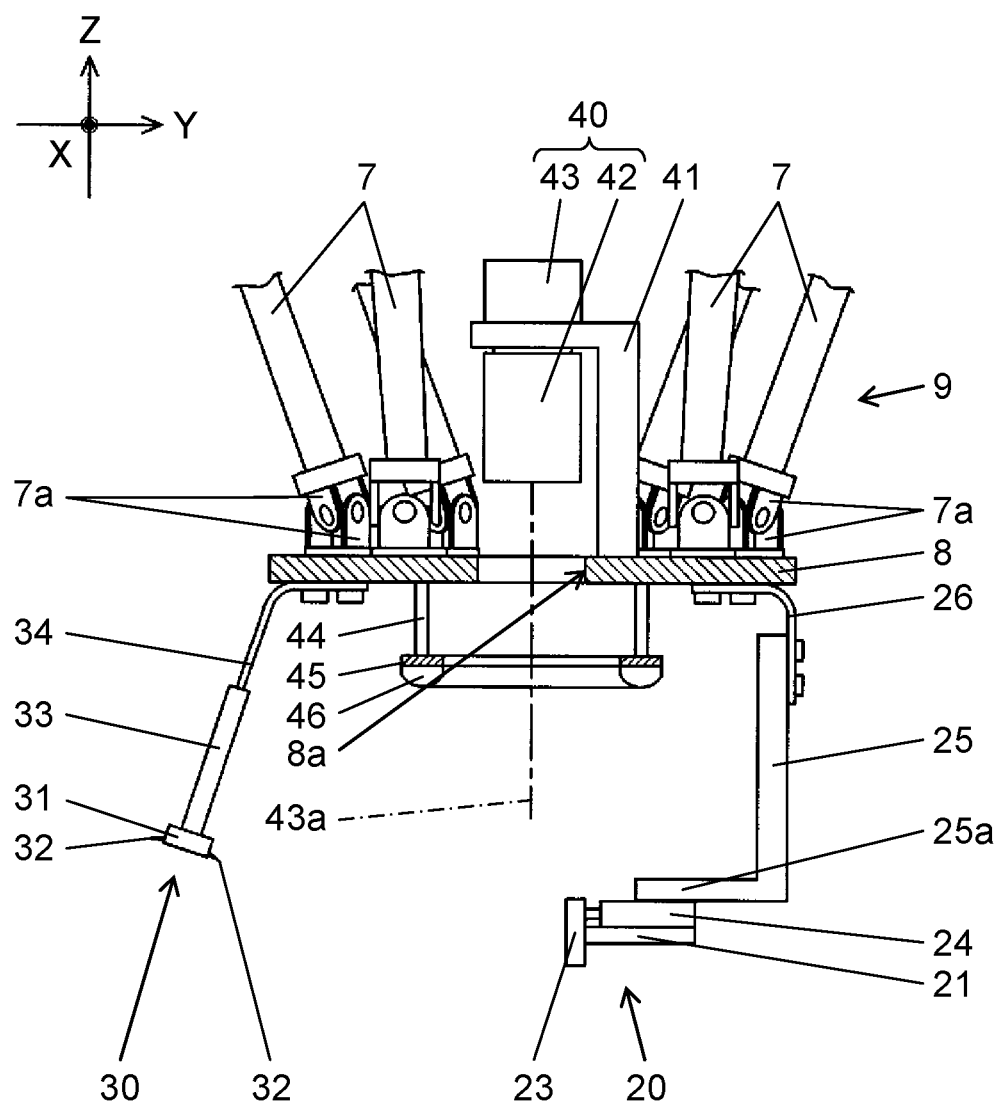
FIG. 2 is a configuration explanation view of a head which is embedded in a robot unit of the electronic equipment assembly apparatus of the exemplary embodiment.

Here, robot unit 5 is a six-degree-of-freedom type parallel link robot including six link members 7 which are separately operated, and the lower end portion of six link members 7 which extend downward from fixing base 6 is bonded to base 8 in head 9 which is a work unit that executes the installation work for installing cable 15 onto connector 13. As illustrated in FIG. 2, link member 7 is bonded to base 8 via universal joint 7a, and by the configuration, it is possible to perform the movement operation of six-degree-of-freedom with respect to base 8 by robot unit 5.

In base 8 which is moved by robot unit 5, cable holding tool 20 and connector lock tool 30 are installed, and further, imager 40 and illumination 46 are provided. Cable holding tool 20 has a function of holding cable 15 which is a target to be installed onto connector 13, and connector lock tool 30 is used for releasing or enabling the lock mechanism provided in connector 13.

By moving base 8 by robot unit 5, it is possible to relatively move cable holding tool 20 and connector lock tool 30 with respect to electronic equipment 4 held on work stage 3. In the installation work for installing installed portion 15c of cable 15 onto connector 13, robot unit 5, cable holding tool 20, and connector lock tool 30 are operated by controller 51 (refer to FIG. 9).

In other words, controller 51 performs the work for installing installed portion 15c of cable 15 onto connector 13 by operating robot unit 5. In the connector installation work, by operating robot unit 5 by controller 51, the work for releasing or enabling the lock of connector 13 by connector lock tool 30, and the work for installing cable 15 held by cable holding tool 20 onto connector 13 of which the lock is released, are executed.

Robot unit 5 and cable holding tool 20 configure a cable mounting mechanism which holds cable 15 and installs cable 15 onto connector 13. In addition, robot unit 5 and connector lock tool 30 configure the lock operation mechanism which releases or enables the lock of connector 13. In addition, in the exemplary embodiment, a configuration in which cable holding tool 20 and connector lock tool 30 are moved by common robot unit 5 is illustrated, but a configuration in which cable holding tool 20 and connector lock tool 30 are operated by separated driving mechanisms may be employed.

A specific configuration of cable holding tool 20 will be described. FIG. 2 is a configuration explanation view of head 9 embedded in robot unit 5 of electronic equipment assembly apparatus 1 of the exemplary embodiment. Opening 8a is provided at the driving center illustrating a center position of the plurality of universal joints 7a in base 8 illustrated in FIG. 2. On a lower surface in the vicinity of a side end portion separated in a rightward direction from opening 8a, L-like bracket 25 is bonded by curve-like stopper 26. On the lower surface of fixing member 25a which extends in a horizontal direction in bracket 25, cable holding tool 20 is held. Cable holding tool 20 includes a pair of chucks 23 (width direction regulators) which perform an opening and closing operation by actuator 24, and cable suctioning portion 21 bonded to the lower surface of actuator 24.

Figure 5:
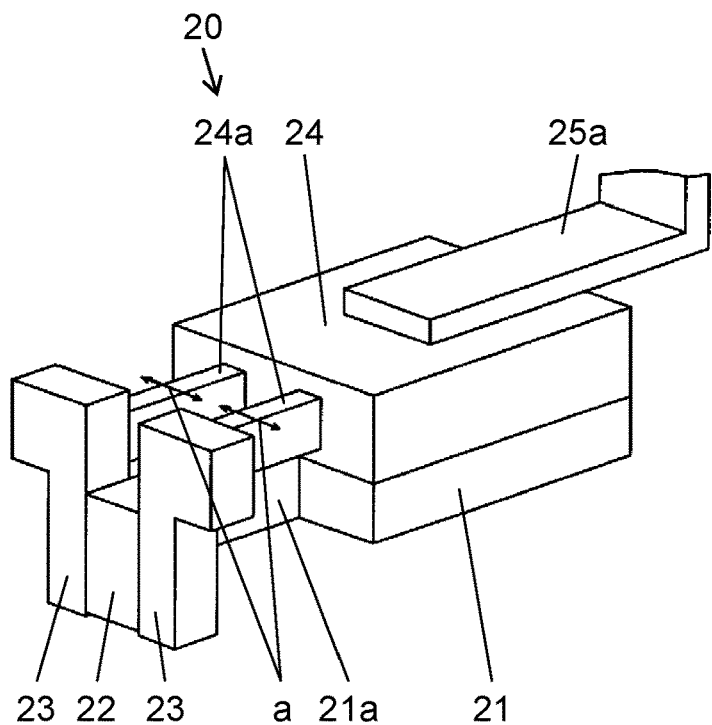
FIG. 5 is a configuration explanation view of a cable holding tool of the electronic equipment assembly apparatus of the exemplary embodiment.
Figure 5:
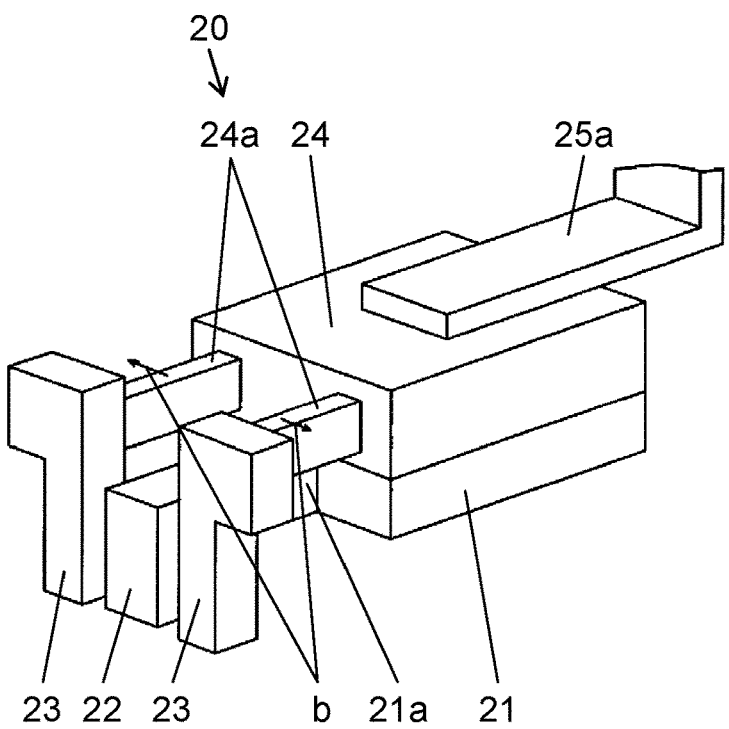

FIG. 5 is a configuration description view of cable holding tool 20 of electronic equipment assembly apparatus 1 of the exemplary embodiment. As illustrated in part (a) of FIG. 5, actuator 24 is bonded to the lower surface of fixing member 25a, and accordingly, cable holding tool 20 is fixed and held on the lower surface side of base 8. On a pair of moving arms 24a which extend in a lateral direction from actuator 24, chucks 23 (width direction regulators) are respectively installed. By driving actuator 24, moving arm 24a moves in an opening/closing direction (arrow a direction) together with chuck 23.

Between a pair of chucks 23, contactor 22 provided at a tip end of linker 21a which extends from cable suctioning portion 21 is positioned. As contactor 22 comes into contact (refer to FIG. 12) with a side surface (upper surface) of cable 15, it is possible to hold cable 15 by cable holding tool 20. In addition, as illustrated in part (b) of FIG. 5, by driving actuator 24, chuck 23 moves in a direction of separating from contactor 22 (arrow b).

Figure 6:
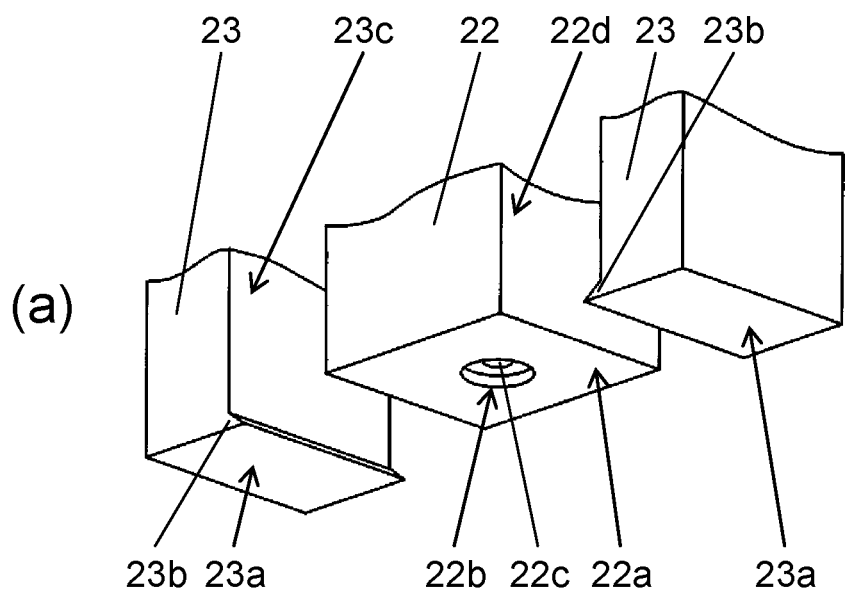
FIG. 6 is a functional explanation view of the cable holding tool of the electronic equipment assembly apparatus of the exemplary embodiment.
Figure 6:
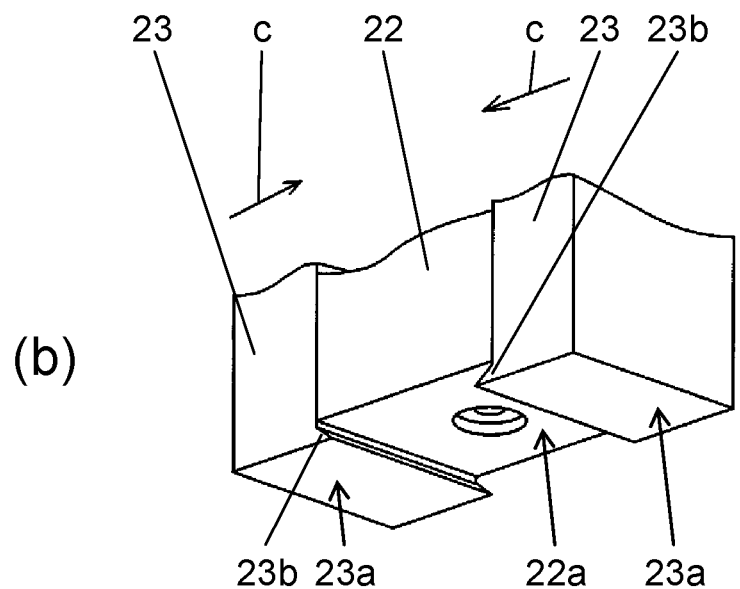
Figure 7:
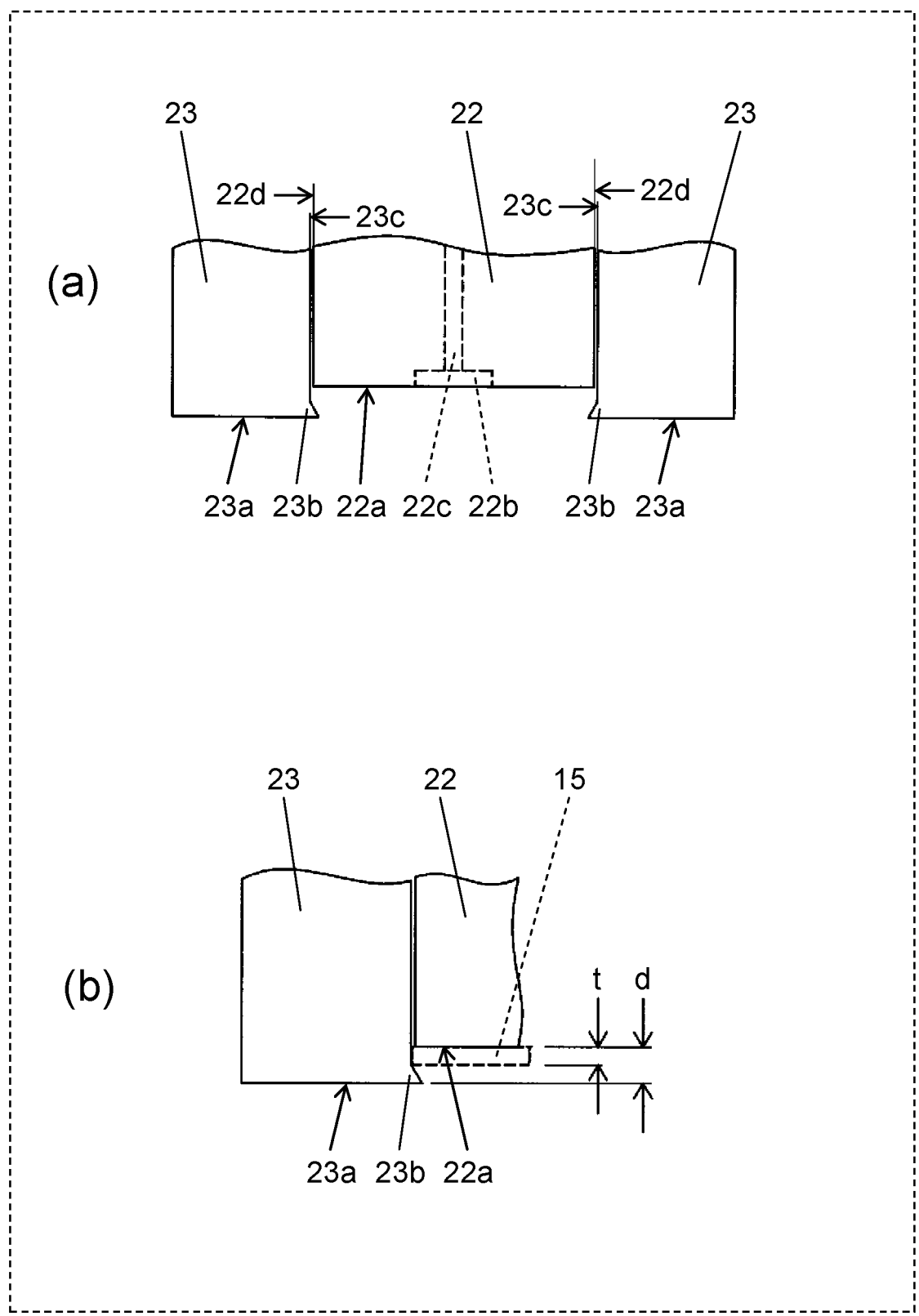
FIG. 7 is a shape explanation view of a chuck and a contactor which configure the cable holding tool of the electronic equipment assembly apparatus of the exemplary embodiment.

With reference to FIG. 6 and part (a) of FIG. 7, a detailed shape of contactor 22 and chuck 23 will be described. FIG. 6 is a functional description view of cable holding tool 20 of electronic equipment assembly apparatus 1 of the exemplary embodiment. Part (a) of FIG. 6 illustrates a state where chuck 23 and contactor 22 are separated from each other. Part (b) of FIG. 6 illustrates a state where chuck 23 and contactor 22 come into contact with each other. Part (a) of FIG. 7 is a shape description view of chuck 23 and contactor 22 which configure cable holding tool 20 of electronic equipment assembly apparatus 1 of the exemplary embodiment. Part (b) of FIG. 7 is a partially enlarged view of part (a) of FIG. 7. As illustrated in part (a) of FIG. 6 and part (a) of FIG. 7, the lower surface of contactor 22 is contact surface 22a which comes into contact with the side surface of cable 15, and suction opening 22b which communicates with vacuum-suction hole 22c is open on contact surface 22a. Vacuum-suction hole 22c is connected to a vacuum-suction source (not illustrated) via a suction path provided on the inside of cable suctioning portion 21, the inside of suction opening 22b is vacuum-suctioned via vacuum-suction hole 22c in a state where cable 15 comes into contact with contact surface 22a, and accordingly, contactor 22 holds cable 15 by vacuum-sucking.

Therefore, suction opening 22b which communicates with vacuum-suction hole 22c is a suctioner which vacuum-suctions and holds the side surface of cable 15 that comes into contact with contactor 22. In addition, the suctioner is formed on contact surface 22a of contactor 22, and a pair of chucks 23 is configured to be disposed at a position at which contactor 22 is interposed. In this manner, by disposing contact surface 22a between chucks 23 which nip cable 15 from the width direction, it is possible to stably hold cable 15.

Both side surfaces 22d of contactor 22 and inner side surface 23c of chuck 23 freely come into contact with each other and are separated from each other, and protrusion 23b on a triangle section that protrudes in an inner direction is provided in a lower end portion of inner side surface 23c. By driving actuator 24, as illustrated in part (b) of FIG. 6, the pair of chucks 23 is operated in a closing direction, and accordingly, as illustrated in part (a) of FIG. 7, inner side surface 23c of chuck 23 and both side surfaces 22d of contactor 22 are in a state of being close to each other with a predetermined fine void or directly abutting against each other.

Figure 12:
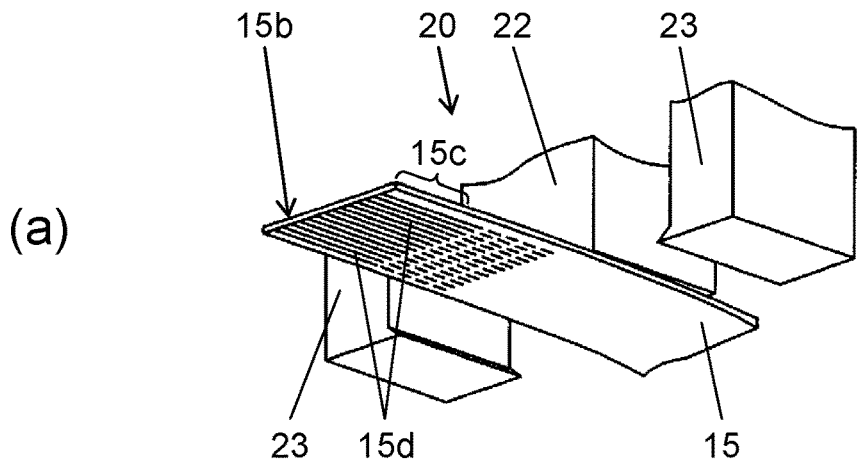
FIG. 12 is an operation description view illustrating the electronic equipment assembly method of the exemplary embodiment.
Figure 12:
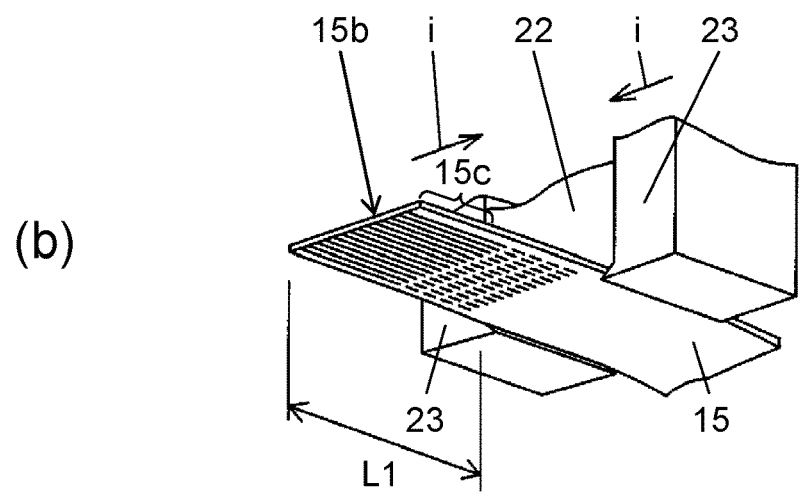
Figure 12:
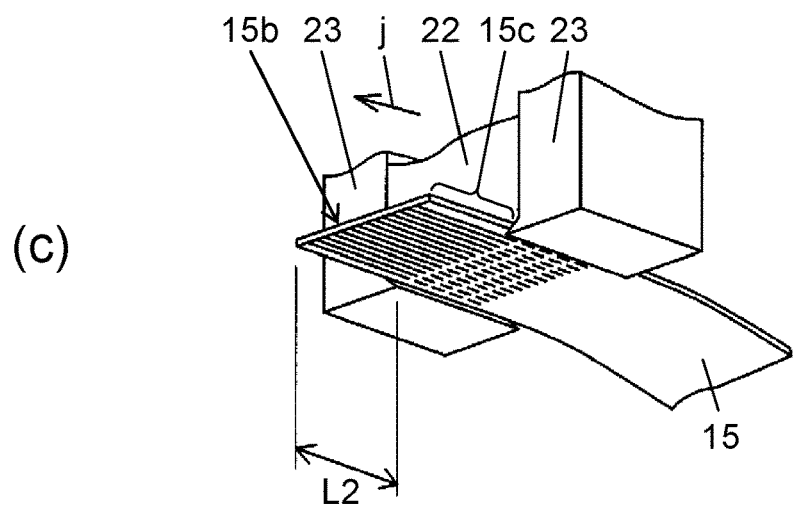

In this state, inner side surface 23c of a pair of chucks 23 abuts against both side end surfaces of cable 15 which comes into contact with and is suctioned and held by contact surface 22a, and nips cable 15 in the width direction (part (b) of FIG. 12). Accordingly, the position in the width direction with respect to suction opening 22b of cable 15 is regulated. In other words, a pair of chucks 23 which nips cable 15 in the width direction is a width direction regulator which regulates the position in the width direction with respect to suction opening 22b (suctioner) of cable 15 which comes into contact with contact surface 22a of contactor 22. In this configuration, a pair of chucks 23 can perform the opening and closing operation by actuator 24. As illustrated in part (b) of FIG. 6 and part (a) of FIG. 7, when a pair of chucks 23 is operated in the closing direction and a pair of chucks 23 becomes close to each other, the position in the width direction of cable 15 is regulated.

In this state, as illustrated in part (b) of FIG. 7, lower surface 23a of chuck 23 protrudes downward only by a predetermined protrusion dimension d from contact surface 22a of contactor 22, and both side end portions of cable 15 is nipped by the protruding part. Here, protrusion dimension d from contactor 22 of a pair of chucks 23 is appropriately set within a range of one time or greater and three times or less thickness t of cable 15. In this manner, in a configuration in which cable 15 is nipped by the protruding part of chuck 23, protrusion 23b which protrudes to contactor 22 side from inner side surface 23c is formed on lower surface 23a, and thus, it is possible to prevent cable 15 in a state of being nipped by a pair of chucks 23 from falling out downward.

Figure 8:
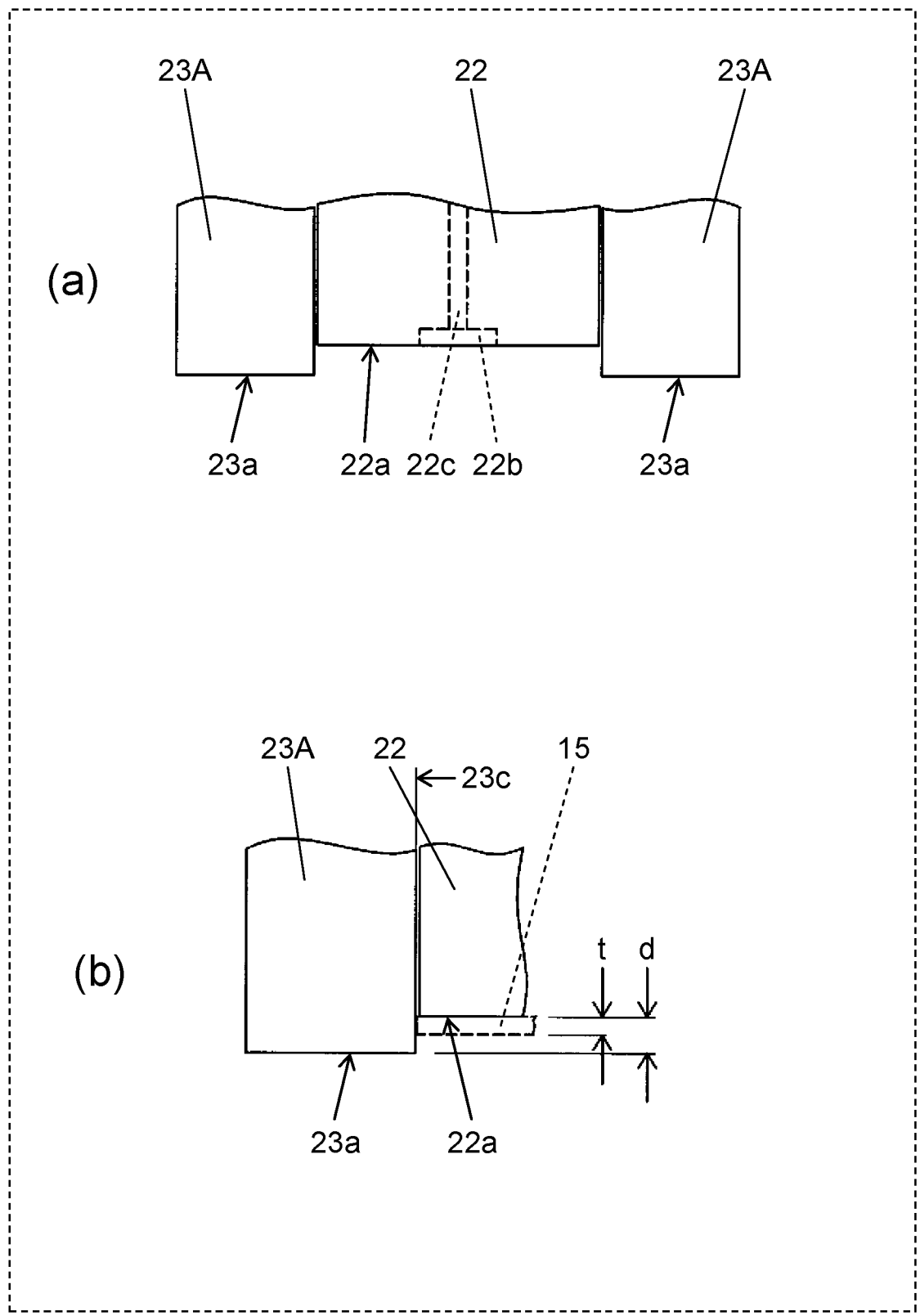
FIG. 8 is a shape explanation view of the chuck and the contactor which configure the cable holding tool of the electronic equipment assembly apparatus of the exemplary embodiment.

In addition, in chuck 23 illustrated in FIGS. 6 and 7, an example in which protrusion 23b which allows lower surface 23a to protrude to contactor 22 side is formed in the lower end portion of inner side surface 23c, is illustrated, but protrusion 23b is not necessary. In other words, similar to chuck 23A illustrated in FIG. 8, the lower end portion of inner side surface 23c may have a smooth shape. Part (a) of FIG. 8 is a shape explanation view of chuck 23A and contactor 22 which configure cable holding tool 20 of electronic equipment assembly apparatus 1 of the exemplary embodiment. Part (b) of FIG. 8 is a partially enlarged view of part (a) of FIG. 8. Even in this example, lower surface 23a of chuck 23A protrudes downward only by predetermined protrusion dimension d from contact surface 22a of contactor 22, and both side end portions of cable 15 are nipped by the protruding part. Here, similar to the examples illustrated in FIGS. 6 and 7, protrusion dimension d from contactor 22 of a pair of chucks 23 is appropriately set within a range of one time or greater and three times or less thickness t of cable 15.

Next, a configuration of connector lock tool 30 will be described. In FIG. 2, on the lower surface on the left end portion side of base 8, shaft 33 which extends obliquely downward in an outer direction is fixed via stopper 34. Tip end portion 31 having a rectangular block shape is installed at the tip end of shaft 33, and claw 32 protrudes in both side end portions of tip end portion 31. Shaft 33, tip end portion 31, and claw 32 configure connector lock tool 30 which is used for releasing or enabling the lock of connector 13.

As described above, the lock mechanism provided in connector 13 performs fixing and fixing and releasing with respect to connector 13 of installed portion 15c by opening and closing swing portion 14 provided to be freely raised from and lowered to connector 13 by using connector lock tool 30. In connector 13, in order to release the lock of connector 13 in a state where swing portion 14 is pushed down and the lock is enabled, by operating robot unit 5, claw 32 is inserted into a void between the lower surface of swing portion 14 in a pushed-down and closed state and connector 13, and swing portion 14 is allowed to stand by claw 32 by moving shaft 33 in this state (refer to part (b) of FIG. 10).

In addition, in order to enabling the lock again after releasing the lock, tip end portion 31 abuts against swing portion 14 in a standing state from the upper surface side, and pushes down swing portion 14 by tip end portion 31 (refer to part (d) of FIG. 13). In other words, connector lock tool 30 includes tip end portion 31 which pushes down swing portion 14 and claw 32 which is used for allowing swing portion 14 to stand, and the plurality of claws 32 are configured to be provided in tip end portion 31 in the exemplary embodiment.

On the upper surface of base 8, in bracket 41 which stands in the vicinity of opening portion 8a, imager 40 including optical lens portion 42 and camera 43 is installed in a downward posture by matching imaging optical axis 43a to the driving center. In a state where robot unit 5 is operated and head 9 is positioned above electronic equipment 4 held by work stage 3, by performing the imaging by imager 40, it is possible to obtain an image of installed portion 15c of cable 15 held by cable holding tool 20 and an image of connector 13 installed onto circuit board 12.

On the lower surface side of base 8, support member 44 stands below at a position which surrounds opening portion 8a. In the lower end portion of support member 44, illumination holding plate 45 which corresponds to an external shape of electronic equipment 4 is held, and illumination 46 configured of a light emitting body, such as an LED, is installed onto the lower surface of illumination holding plate 45. When performing the imaging by imager 40, illumination 46 is turned on and cable 15 and connector 13 which are imaging targets are illuminated. In other words, electronic equipment assembly apparatus 1 is configured to include imager 40 for detecting installed portion 15c of cable 15 and illumination 46 in base 8 of head 9.

In addition, cable holding tool 20 and connector lock tool 30 are disposed to face each other with imaging optical axis 43a of camera 43 of imager 40 interposed therebetween. By the disposition, it is possible to image both of cable 15 held by cable holding tool 20 and connector 13 which is a target of locking by connector lock tool 30, by common imager 40.

Figure 9:
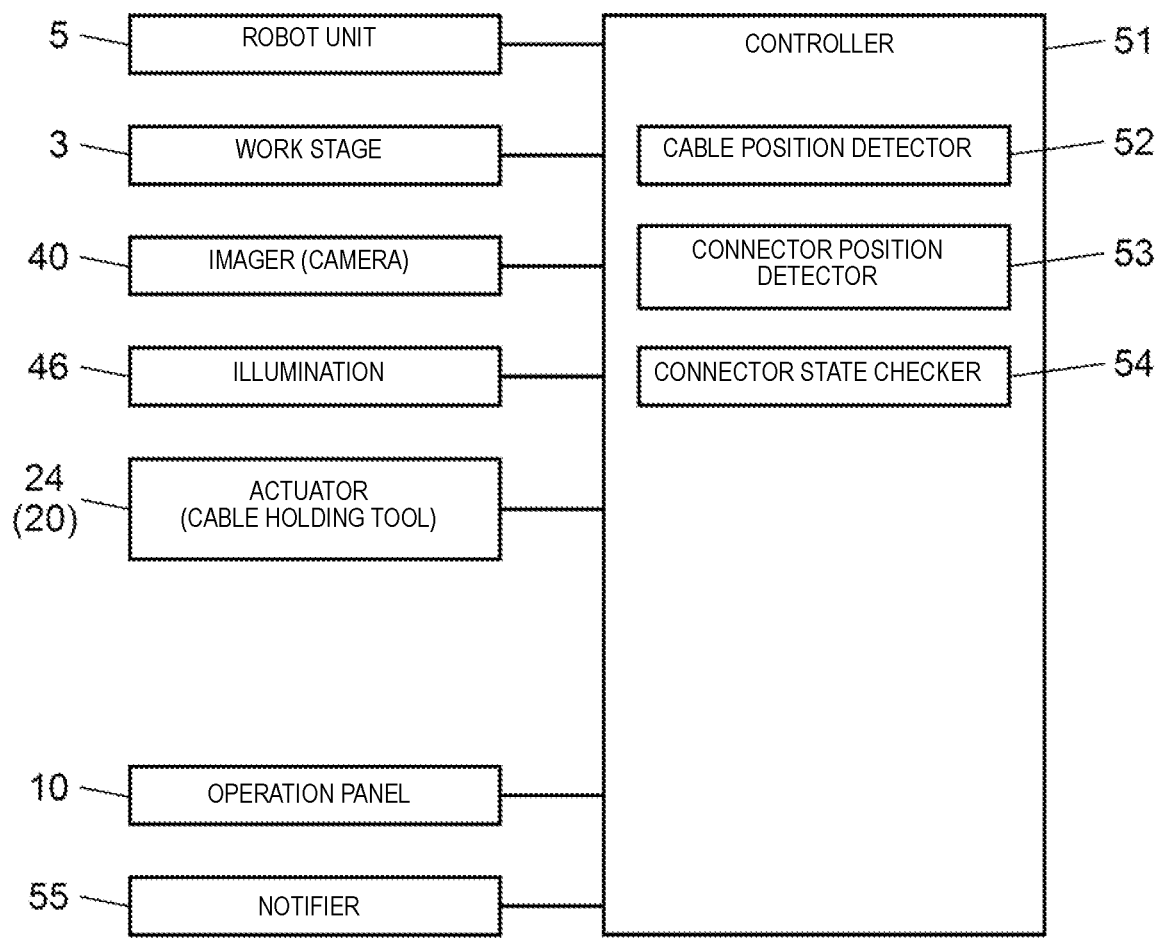
FIG. 9 is a block diagram illustrating a configuration of a control system of the electronic equipment assembly apparatus of the exemplary embodiment.

Next, with reference to FIG. 9, a configuration of a control system of electronic equipment assembly apparatus 1 will be described. FIG. 9 is a block diagram illustrating a configuration of a control system of electronic equipment assembly apparatus 1 of the exemplary embodiment. In FIG. 9, controller 51 connects robot unit 5, work stage 3, imager 40 (camera), illumination 46, actuator 24 (cable holding tool 20), operation panel 10, and notifier 55 to each other.

As controller 51 controls robot unit 5, work stage 3, and actuator 24 of cable holding tool 20, the cable installing operation illustrated in FIGS. 10 to 14 is executed. In other words, in the above-described control processing, controller 51 executes the work for releasing or enabling the lock of connector 13 by connector lock tool 30 by operating robot unit 5, and the work for installing cable 15 held by cable holding tool 20 onto connector 13.

In the execution process of the cable mounting operation, controller 51 controls imager 40 and illumination 46, executes imaging processing for detecting the position of installed portion 15c of cable 15 and connector 13. Operation commands for executing the processing are input via operation panel 10, and accordingly, controller 51 executes the predetermined control processing. Notifier 55 performs processing of displaying the notification of a case where abnormality or a defect is generated in the execution process of the cable installing operation by electronic equipment assembly apparatus 1, on operation panel 10.

In addition, controller 51 includes cable position detector 52, connector position detector 53, and connector state checker 54, as internal control processing functions. Imager 40, cable position detector 52, connector position detector 53, and connector state checker 54 configure an image recognizing system provided in electronic equipment assembly apparatus 1, and has function which will be described hereinafter.

Cable position detector 52 detects the position of installed portion 15c based on a recognition screen obtained by imaging installed portion 15c of cable 15 in a state of being held by cable holding tool 20 by imager 40. Connector position detector 53 detects the position of connector 13 based on a recognition screen obtained by imaging connector 13 which is similarly an installation target by imager 40. In the cable mounting operation of installing installed portion 15c onto connector 13, controller 51 controls movement of cable holding tool 20 by robot unit 5 based on the position detection result of installed portion 15c and connector 13.

Connector state checker 54 performs processing for checking the state of the lock mechanism provided in connector 13 based on the image obtained by imaging connector 13 by imager 40.

In addition, in a case where connector state checker 54 checks the state of the lock of connector 13 before installed portion 15c of cable 15 is installed, and as a result of the checking, connector state checker 54 determines the state where the lock is enabled or the work for installing installed portion 15c is interfered, controller 51 stops the installation work of installed portion 15c of cable 15 with respect to connector 13, and notifier 55 notifies the operator of the contents. Furthermore, connector state checker 54 checks the lock of connector 13 on which installed portion 15c of cable 15 is installed, and as a result of the checking, in a case where it is determined that the lock is not in an effectively functioning state, controller 51 notifies the operator of the contents by notifier 55.

As descried above, electronic equipment assembly apparatus 1 described in the exemplary embodiment has a function of installing installed portion 15c of belt-shape cable 15 onto connector 13 of electronic equipment 4 held by work stage 3. Electronic equipment assembly apparatus 1 is configured to include cable holding tool 20 which holds cable 15, robot unit 5 which relatively moves cable holding tool 20 with respect to electronic equipment 4 held by work stage 3, and controller 51 which installs installed portion 15c of cable 15 onto connector 13 by operating robot unit 5.

In the above-described configuration, cable holding tool 20 is configured to include contactor 22 which comes into contact with the side surface of cable 15, suction opening 22b which functions as a suctioner that vacuum-suctions and holds the side surface of cable 15 that comes into contact with contactor 22, and a pair of chucks 23 which functions as the width direction regulator that regulates the position in the width direction with respect to the suctioner of cable 15 that comes into contact with contactor 22. By the configuration, it is possible to stably hold cable 15 which has low rigidity and is likely to be bent, with high positioning accuracy. Therefore, even in a case where cable 15 having such characteristics is regarded as the target, it is possible to automate connection work with respect to connector 13 by equipment having a simple configuration, and to improve work efficiency.

Next, with reference to FIGS. 10 to 14, the cable installation work performed by electronic equipment assembly apparatus 1 having the above-described configuration will be described. The cable installation work corresponds to an electronic equipment assembly method in which one end portion 15a is connected to the electronic circuit, and installed portion 15c in which root 150 close to one end portion 15a stands upward and which is provided in the other end portion 15b of belt-shape cable 15 is automatically installed onto connector 13 of electronic equipment 4.

Part (a) of FIG. 10 illustrates a state of electronic equipment 4 before executing the cable installation work. In other words, cable 15 which is the target of the cable installation work is in a state of being connected to the electronic circuit (not illustrated) in which one end portion 15a is formed on circuit board 12 of electronic equipment 4. In addition, root 150 which is close to one end portion 15a stands upward from the edge portion of circuit board 12 and in a posture where the other end portion 15b is oriented upward. At this time, the posture of cable 15 which is in a state of standing from circuit board 12 in accordance with the degree of deformation of cable 15 is not constant, and as illustrated in part (a) of FIG. 10, there is variance of the posture or the position of cable 15 in the air.

Part (b) of FIG. 10 illustrates releasing of the lock in connector 13 which is performed when the cable installation work is started. In other words, in electronic equipment 4 which is in a state of being conveyed onto work stage 3 in electronic equipment assembly apparatus 1, connector 13 is in a state where swing portion 14 is pulled down and the lock is enabled. Therefore, when the cable installation work is started, the work for allowing swing portion 14 which is in a state of being pulled down in connector 13 to stand by using connector lock tool 30, and for releasing the lock, is performed.

When releasing the lock, first, connector lock tool 30 fixed to base 8 is moved (arrow d) by operating robot unit 5, and tip end portion 31 is positioned on a side of connector 13 which is the target of the releasing of the lock. At this time, as illustrated in part (b) of FIG. 10, first, at the end portion on the open side when swing portion 14 oscillates in connector 13, tip end portion 31 is positioned (refer to tip end portion 31 illustrated by a broken line). Next, in a state where claw 32 enters the void between the lower surface of swing portion 14 and connector 13, shaft 33 is moved (arrow e) obliquely upward. Accordingly, by claw 32 which moves together with shaft 33, swing portion 14 oscillates such that the end portion on the open side stands, and the lock of connector 13 is released.

Next, the cable installation work for installing installed portion 15c of cable 15 is executed with respect to connector 13 which is in a state where the lock is released. Here, first, robot unit 5 is operated, cable holding tool 20 is moved (arrow f) as illustrated in part (a) of FIG. 11, and contactor 22 (refer to FIGS. 5 and 6) of cable holding tool 20 and chuck 23 are allowed to be close to root 150 of cable 15 which is in a standing posture. At this time, a pair of chucks 23 provided in cable holding tool 20 is in an open state, and it is possible to guide root 150 between a pair of chucks 23.

Next, as illustrated in part (b) of FIG. 11, by bringing contactor 22 of cable holding tool 20 into contact with root 150 of cable 15, the intermediate part of cable 15 is held. In addition, furthermore, by allowing cable holding tool 20 to be close to connector 13, cable 15 is pushed down to connector 13 side (arrow g). In the process, cable 15 is led to between a pair of chucks 23, and follows contact surface 22a of the contactor 22. In other words, as illustrated in part (a) of FIG. 12, cable 15 is guided to between a pair of chucks 23 (width direction regulator) which is in an open state, and the upper surface of cable 15 is brought into contact with and follows contact surface 22a (refer to FIG. 6) of contactor 22.

Next, actuator 24 is driven, and as illustrated in part (b) of FIG. 12, a pair of chucks 23 is moved in the closing direction (arrow i), both side end portions of cable 15 are nipped by chuck 23, and the position in the width direction is regulated. Together with this, cable 15 is vacuum-suctioned and held by suction opening 22b formed on lower surface 23a of contactor 22. At this time, cable 15 is in a state where the other end portion 15b protrudes only by first protrusion length L1 from chuck 23. First protrusion length L1 individually varies according to the degree of deformation of cable 15 in the state illustrated in FIG. 11.

As illustrated in part (b) of FIG. 11, pushed-down cable 15 is suctioned and held by suction opening 22b of contact surface 22a provided in cable holding tool 20. In addition, as illustrated in part (c) of FIG. 11, in this state, cable holding tool 20 is relatively moved with respect to connector 13 (arrow h). At this time, the other end portion 15b of cable 15 is in a state of protruding only by first protrusion length L1 described above from chuck 23.

Next, as illustrated in part (a) of FIG. 13, cable holding tool 20 is moved (arrow k) with respect to connector 13, and the other end portion 15b of cable 15 is temporarily positioned with respect to connector 13. The temporary positioning is performed while adjusting the position of cable holding tool 20 such that the other end portion 15b of cable 15 is positioned within an imaging range in which the imaging by camera 43 is possible together with connector 13 at the same time.

Here, protrusion length L2 and a stop position of cable holding tool 20 are set in advance such that the other end portion 15b is positioned within the above-described imaging range. When performing the temporary positioning, as illustrated in part (c) of FIG. 12, cable holding tool 20 is moved (arrow j) while allowing cable holding tool 20 to slide on a suction holding surface of cable 15 by contact surface 22a such that protrusion length L2 is realized. In other words, by allowing cable holding tool 20 to relatively slide with respect to cable 15 while holding cable 15 by cable holding tool 20, cable holding tool 20 is allowed to be close to the other end portion 15b of cable 15.

Figure 14:
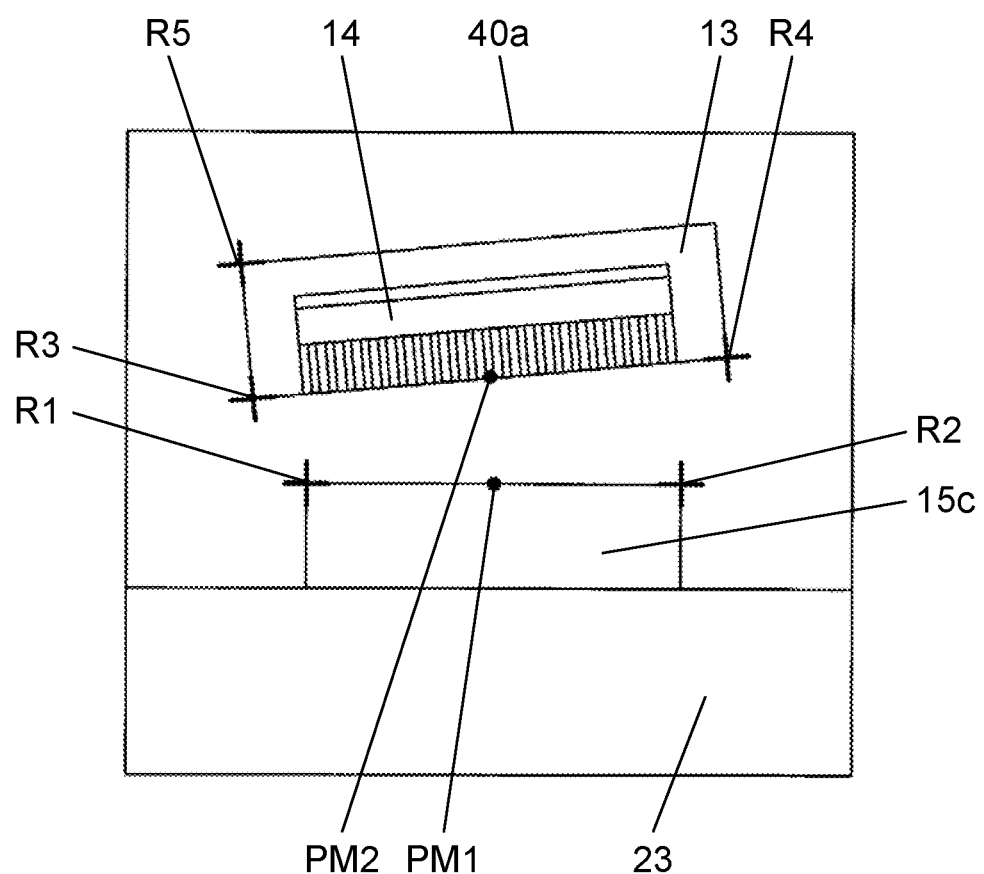
FIG. 14 is an explanation view of an image for recognizing positions of the connector and the cable in the electronic equipment assembly method of the exemplary embodiment.

In this state, checking processing for positioning connector 13 and the other end portion 15b may be performed. In this case, connector 13 and the temporarily positioned other end portion 15b of cable 15 are imaged by camera 43 of image checking system provided in electronic equipment assembly apparatus 1. Accordingly, recognized image 40a illustrated in FIG. 14 is obtained. In recognized image 40a, an image of connector 13 before installing the cable in which swing portion 14 that configures the lock mechanism is in an open state, and an image when the tip end portion of chuck 23 of cable holding tool 20 which holds cable 15 installed onto connector 13 is viewed in a plan view, appear. In recognized image 40a, since the positional relationship between imager 40 and cable holding tool 20 is fixed, chuck 23 always appears at a fixing position which is identical to an image frame direction.

Meanwhile, installed portion 15c of cable 15 which is held by chuck 23 shows a slight positional shift caused by the positional difference or the like in the holding operation. Furthermore, connector 13 is also in a positionally shifted state caused by a position holding error of electronic equipment 4 on work stage 3 or a positional error of connector 13 in electronic equipment 4. In other words, the relative positional relationship between connector 13 and installed portion 15c installed onto connector 13 varies for each of connectors 13 which is the installation work target.

Therefore, when inserting and installing installed portion 15c onto installer 13a of connector 13, position correction data for correcting the variance of the relative positional relationship is obtained by recognizing processing by cable position detector 52 and connector position detector 53 which configure the image recognizing system, with respect to recognized image 40a illustrated in FIG. 14.

In other words, the relative positional relationship of both of connector 13 and cable 15 is acquired based on the image of connector 13 and cable 15 which is imaged by the above-described image recognizing system. Specifically, by acquiring positions of recognition points R1 and R2 for detecting the position of installed portion 15c, a center point of recognition points R1 and R2 is a representative point PM1 which shows the position of installed portion 15c. Furthermore, by acquiring positions of recognition points R3, R4, and R5 for detecting the position of connector 13, a center point of recognition points R4 and R5 is a representative point PM2 which shows the position of connector 13.

After this, the installation of cable 15 onto connector 13 is performed. In other words, based on the positional relationship acquired by the above-described recognizing processing, cable holding tool 20 is relatively moved with respect to connector 13, and installed portion 15c of the other end portion 15b is installed onto connector 13. In the installing operation, cable holding tool 20 which holds cable 15 is positioned such that each of representative points PM1 and PM2 is appropriately disposed. In other words, as illustrated in part (b) of FIG. 13, cable holding tool 20 is moved (arrow m), and installed portion 15c of cable 15 is inserted from a slightly oblique direction into installer 13a of connector 13 of electronic equipment 4. At this time, swing portion 14 is in a standing open state, and insertion of installed portion 15c is not interfered.

Next, as illustrated in part (c) of FIG. 13, the posture of cable holding tool 20 is adjusted (arrow n), and wiring pattern 15d (refer to part (a) of FIG. 12) formed in installed portion 15c is brought into contact with terminal surface 13b (refer to part (a) of FIG. 11) of connector 13 by making installed portion 15c be in a horizontal posture. After installing cable 15 onto connector 13 in this manner, an operation of enabling the lock of cable 15 in connector 13 is performed.

In other words, as illustrated in part (d) of FIG. 13, connector lock tool 30 is allowed to be close to connector 13 which is the target of the lock operation (arrow o). In addition, tip end portion 31 of connector lock tool 30 is allowed to abut against swing portion 14 which is in a standing state from above, and pushes down swing portion 14. Accordingly, installed portion 15c which is installed on installer 13a is pressed by swing portion 14, and cable 15 is prevented from falling out from connector 13.

In addition, in the above-described electronic equipment assembly method, when installing cable 15 held by cable holding tool 20 onto connector 13, cable holding tool 20 is relatively moved with respect to connector 13, and the other end portion 15b of cable 15 is temporarily positioned with respect to connector 13. In addition, the relative positional relationship of both of connector 13 and the temporarily positioned other end portion 15b of cable 15 is acquired based on the image imaged by the image recognizing system, and cable holding tool 20 is moved with respect to connector 13 based on the positional relationship. However, the work operations are not necessary, and it is also possible to omit the work operations according to the work conditions, such as the position accuracy of cable 15 or connector 13 which is the work target, or a degree of the allowed positional error.

In addition, in the above-described example, the belt-shape cable 15 which is in a state where root 150 that is close to one end portion 15a stands upward as cable 15 which is the work target, is regarded as a target, but the condition is also not necessary, and an aspect in which the intermediate part of cable 15 is held by cable holding tool 20 may be employed.

In this manner, the above-described electronic equipment assembly method is an electronic equipment assembly method for installing installed portion 15c of cable 15 onto connector 13 of electronic equipment 4 by electronic equipment assembly apparatus 1 having the above-described configuration. In addition, regarding electronic equipment 4 conveyed into electronic equipment assembly apparatus 1 as a target, first, the lock of connector 13 is released by using connector lock tool 30. Next, cable 15 is held by cable holding tool 20, installed portion 15c of cable 15 is installed onto connector 13 of electronic equipment 4 by moving cable holding tool 20, and the lock of connector 13 is enabled by connector lock tool 30.

In addition, in the electronic equipment assembly apparatus 1 having the above-described configuration, cable holding tool 20 and connector lock tool 30 are installed onto base 8 which is moved by robot unit 5. In the above-described electronic equipment assembly method, an operation after releasing the lock of connector 13 until enabling the lock, is executed by robot unit 5. By the configuration, it is possible to automate the assembly of electronic equipment 4 including connector 13 with the lock mechanism, and to improve work efficiency.

In addition, in the examples illustrated in FIGS. 5 to 8, as a configuration of the width direction regulator which regulates the position in the width direction of cable 15 that comes into contact with contactor 22, a configuration example in which a pair of chucks 23 disposed nipping contactor 22 is open and closed by actuator 24, is illustrated. However, as described in modification examples illustrated in FIGS. 15 and 16, the width direction regulator may be configured without using chuck 23 which performs the opening and closing operation.

Figure 15:
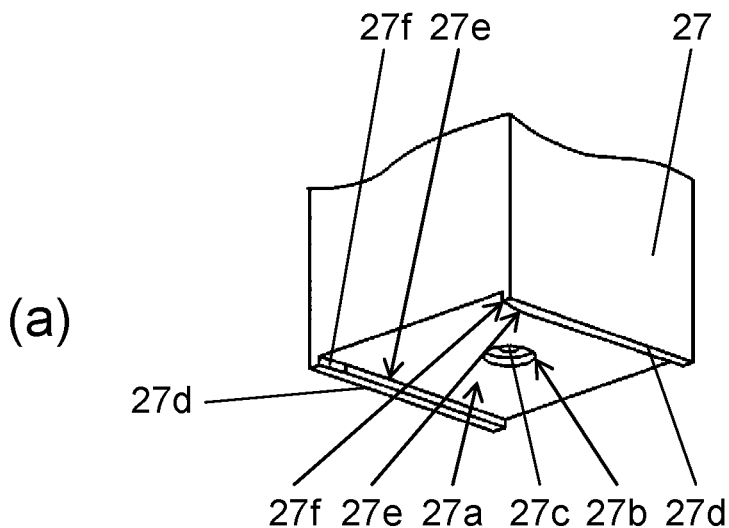
FIG. 15 is a configuration explanation view of a modification example of the cable holding tool of the electronic equipment assembly apparatus of the exemplary embodiment.
Figure 15:
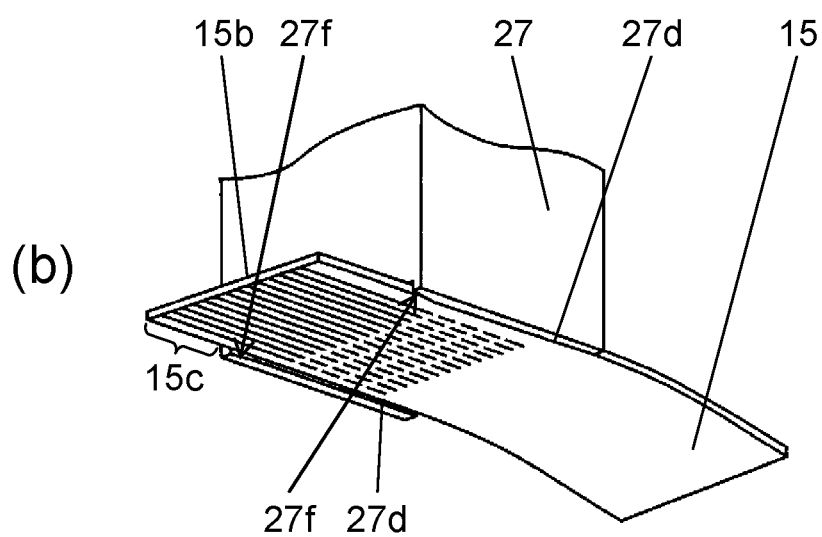
Figure 16:
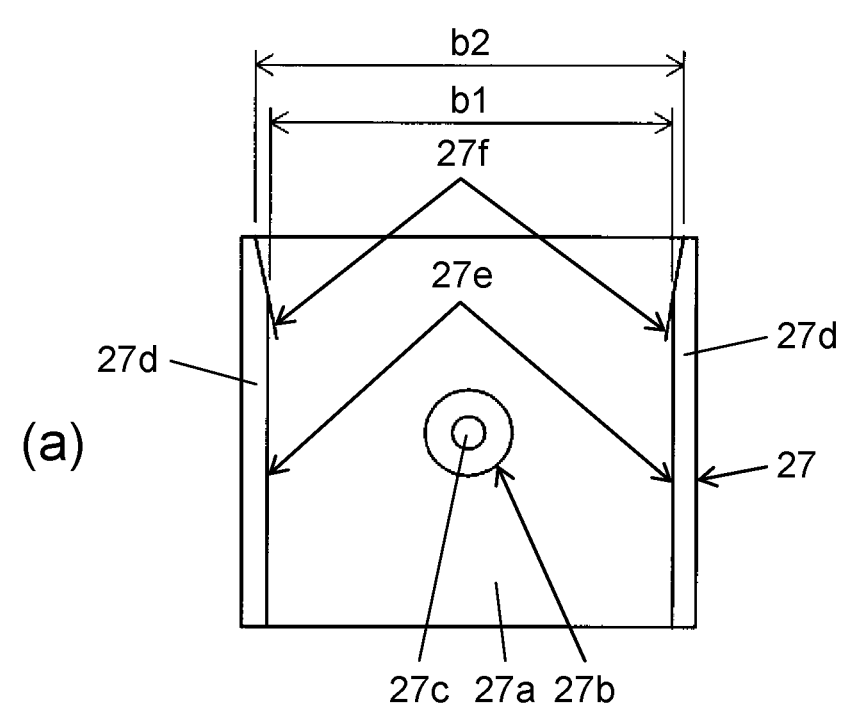
FIG. 16 is a configuration explanation view of a modification example of the cable holding tool of the electronic equipment assembly apparatus of the exemplary embodiment.
Figure 16:
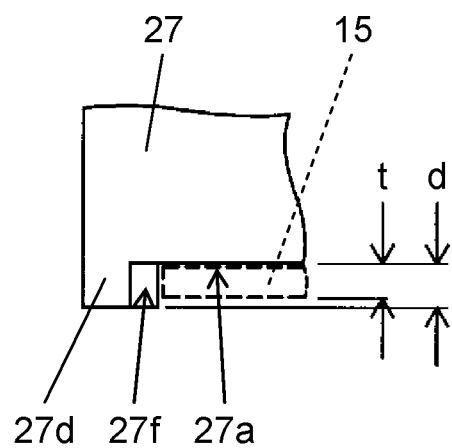

FIGS. 15 and 16 are configuration description views of the modification examples of cable holding tool 20 of electronic equipment assembly apparatus 1 of the exemplary embodiment. Contactor 27 illustrated in part (a) of FIG. 15 has a function common to that of contactor 22 in FIG. 6. In other words, on the lower surface of contactor 27, contact surface 27a which comes into contact with and holds the side surface of cable 15 in the cable installing operation performed by cable holding tool 20 is provided, and suction opening 27b which communicates with vacuum-suction hole 27c is open on contact surface 27a. By vacuum-suctioning the inside of suction opening 27b via vacuum-suction hole 27c in a state where cable 15 is brought into contact with contact surface 27a, contactor 27 holds cable 15 by the vacuum-sucking. Therefore, suction opening 27b which communicates with vacuum-suction hole 27c is a suctioner which vacuum-suctions and holds the side surface of cable 15 that comes into contact with contactor 27. In addition, the suctioner is formed on contact surface 27a of contactor 27.

As illustrated in part (a) of FIG. 15, in the side end portion of contact surface 27a, a pair of protrusions 27d (width direction regulators) which protrudes downward from contact surface 27a is provided. Side surfaces 27e on the inner sides of each of protrusions 27d are provided to be parallel to each other. Distance b1 between side surfaces 27e illustrated in part (a) of FIG. 16 is determined based on the dimension in the width direction of cable 15 which is a target to be held. Accordingly, as illustrated in part (b) of FIG. 15, the positions of both side end surfaces of cable 15 which is the holding target can be regulated by side surface 27e.

In other words, here, in the example, a pair of protrusions 27d which protrudes from contact surface 27a is a width direction regulator which regulates the position in the width direction of cable 15 that comes into contact with contactor 22. In addition, on side surfaces 27e of each of a pair of protrusions 27d, at least a part may be parallel to one direction (longitudinal direction of cable 15), and it is not necessary to provide side surfaces 27e to be parallel across the overall range of contact surface 27a.

At the end portion on one side of vacuum-suction hole 27c in contactor 27, tapered surface 27f of which the dimension between side surfaces 27e on the end surface is an opening dimension b2 that is greater than distance b1, is formed. Tapered surface 27f has a function as a guide that guides cable 15 to a holding position when holding cable 15 by contactor 27.

In other words, when holding cable 15 by contactor 27, first, the guide in which tapered surface 27f is formed on contact surface 27a is allowed to be close to the side surface (suction holding surface) of cable 15. In addition, cable 15 is brought into contact with the overall range of contact surface 27a while guiding the side end surface of cable 15 by tapered surface 27f. In addition, even in this case, as illustrated in part (b) of FIG. 16, the protrusion dimension d from contact surface 27a of contactor 27 of a pair of protrusions 27d is selected and set from the range of one time or greater to three times or less thickness t of cable 15. Even in a case of using contactor 27 having the configuration, it is possible to stably hold cable 15 which is thin and is likely to be bent with high accuracy, and to obtain effects which are substantially similar to those of the examples illustrated in FIGS. 5 to 8.

As described above, the electronic equipment assembly apparatus of the disclosure is an electronic equipment assembly apparatus which installs the installed portion of the belt-shape cable onto the connector of the electronic equipment. The electronic equipment assembly apparatus includes: the cable holding tool which holds the cable; the work stage which holds the electronic equipment; the robot unit which relatively moves the cable holding tool with respect to the electronic equipment held by the work stage; and the controller which installs the installed portion of the cable onto the connector by operating the robot unit. The cable holding tool includes: the contactor which comes into contact with the side surface of the cable; the suctioner which vacuum-suctions and holds the side surface of the cable that comes into contact with the contactor; and the width direction regulator which regulates the position in the width direction with respect to the suction hole of the cable that comes into contact with the contactor.

In addition, the electronic equipment assembly method of the disclosure is an electronic equipment assembly method for automatically installing the other end portion of the belt-shape cable of which one end portion is connected to the electronic circuit onto the connector of the electronic equipment, by using the electronic equipment assembly apparatus. The intermediate part of the cable is held by the cable holding tool which holds the cable, the cable holding tool is allowed to be close to the other end portion by relatively sliding the cable holding tool with respect to the cable while holding the cable by the cable holding tool, and the other end portion is installed onto the connector by relatively moving the cable holding tool with respect to the connector.

The electronic equipment assembly method of the disclosure is an electronic equipment assembly method for automatically installing the other end portion of the belt-shape cable of which one end portion is connected to the electronic circuit onto the connector of the electronic equipment, by using the electronic equipment assembly apparatus. The intermediate part of the cable is held by the cable holding tool which holds the cable, and the cable holding tool is allowed to be close to the other end portion by relatively sliding the cable holding tool with respect to the cable while holding the cable of the cable holding tool. In addition, the other end portion is temporarily positioned with respect to the connector by relatively moving the cable holding tool with respect to the connector. The connector and the temporarily positioned other end portion of the cable are imaged by the camera of the image recognizing system provided in the electronic equipment assembly apparatus, the relative positional relationship between the connector and the cable is acquired based on the image of the connector and the cable which are imaged by the image recognizing system, and the other end portion is installed on the connector by relatively moving the cable holding tool with respect to the connector based on the positional relationship.

The electronic equipment assembly method of the disclosure is an electronic equipment assembly method for automatically installing the other end portion of the belt-shape cable of which one end portion is connected to the electronic circuit and the root which is close to the one end portion stands upward, onto the connector of the electronic equipment, by using the electronic equipment assembly apparatus. The cable holding tool which holds the cable is brought into contact with the root, the cable is pushed down to the connector side by allowing the cable holding tool which holds the cable to be close to the connector, the cable which is pushed down by the cable holding tool is held, and the other end portion is installed onto the connector by relatively moving the cable holding tool with respect to the connector.

The electronic equipment assembly method of the disclosure is an electronic equipment assembly method for automatically installing the other end portion of the belt-shape cable of which one end portion is connected to the electronic circuit and the root which is close to the one end portion stands upward, onto the connector of the electronic equipment, by using the electronic equipment assembly apparatus. The cable holding tool which holds the cable is brought into contact with the root, the cable is pushed down to the connector side by allowing the cable holding tool which holds the cable to be close to the connector, the cable which is pushed down by the cable holding tool is held, and the other end portion is temporarily positioned with respect to the connector by relatively moving the cable holding tool with respect to the connector. In addition, the connector and the temporarily positioned other end portion of the cable are imaged by the camera of the image recognizing system provided in the electronic equipment assembly apparatus, and the relative positional relationship of both of the connector and the cable is acquired based on the image of the connector and the cable which is imaged by the image recognizing system. In addition, the other end portion is installed onto the connector by relatively moving the cable holding tool with respect to the connector based on the positional relationship.

Above, according to the electronic equipment assembly apparatus and the electronic equipment assembly method of the disclosure, it is possible to automate the connection work of the cable which is likely to be bent onto the connector by the equipment having a simple configuration, and to improve work efficiency.

The electronic equipment assembly apparatus and the electronic equipment assembly method of the disclosure have an effect of automating the connection work the cable which is likely to be bent to the connector by the equipment having a simple configuration, and improving the work efficiency, and are advantageous in an electronic equipment assembly field for performing the assembly work for installing the cable onto the connector.

What is claimed is:

1. An electronic equipment assembly method for installing a second end portion of a belt-shape cable onto a connector of electronic equipment in a state where a first end portion of the belt-shape cable including the first end portion and the second end portion is connected to an electronic circuit, and a root, which is close to the first end portion, of the cable stands upward, the method comprising:
   allowing a cable holding tool to come into contact with the root;
   pushing down the cable to the connector side by allowing the cable holding tool to be close to the connector;
   holding the cable pushed down by the cable holding tool; and
   installing the second end portion onto the connector by relatively moving the cable holding tool with respect to the connector.

2. An electronic equipment assembly method for installing a second end portion of a belt-shape cable onto a connector of electronic equipment in a state where a first end portion of the belt-shape cable including the first end portion and the second end portion is connected to an electronic circuit, and a root, which is close to the first end portion, of the cable stands upward, the method comprising:
   allowing a cable holding tool which holds the cable to come into contact with the root;
   pushing down the cable to the connector side by allowing the cable holding tool to be close to the connector;
   holding the cable pushed down by the cable holding tool;
   temporary positioning the second end portion with respect to the connector by relatively moving the cable holding tool with respect to the connector;
   taking an image of the connector and the second end portion of the cable, which is temporarily positioned, by a camera;
   acquiring a relative positional relationship of the connector and the cable based on an image of the connector and the cable, which is taken by the camera; and
   installing the second end portion onto the connector by relatively moving the cable holding tool with respect to the connector based on the positional relationship.

3. The electronic equipment assembly method of claim 1, wherein the cable holding tool includes a contactor which holds the cable by vacuum-sucking.

4. The electronic equipment assembly method of claim 3, wherein the contactor includes a pair of protrusions, which regulates a position in a width direction of the cable, on a surface on which the cable is held.

5. The electronic equipment assembly method of claim 3, wherein the cable holding tool includes a pair of width direction regulators so as to nip the contactor.

6. The electronic equipment assembly method of claim 5, wherein the pair of width direction regulators is driven by an actuator and regulates the position in the width direction of the cable.

* * * * *